United States Patent
Kella et al.

(10) Patent No.: US 9,414,311 B2
(45) Date of Patent: Aug. 9, 2016

(54) SYSTEMS AND METHODS FOR POWER SAVINGS IN WIRELESS COMMUNICATIONS

(71) Applicant: QUALCOMM Incorporated, San Diego, CA (US)

(72) Inventors: Leela Prasad Kella, Tamil Nadu (IN); Imran Ansari, Tamil Nadu (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/664,191

(22) Filed: Oct. 30, 2012

(65) Prior Publication Data

US 2014/0119252 A1     May 1, 2014

(51) Int. Cl.
*H04W 52/02*     (2009.01)

(52) U.S. Cl.
CPC ...... *H04W 52/0216* (2013.01); *H04M 2250/02* (2013.01); *H04M 2250/06* (2013.01); *H04W 52/0229* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2003/0117968 A1* | 6/2003 | Motegi et al. | 370/311 |
| 2007/0072578 A1* | 3/2007 | Lee et al. | 455/343.1 |
| 2007/0086374 A1* | 4/2007 | Jang et al. | 370/328 |
| 2007/0206517 A1* | 9/2007 | Kakani | 370/310 |
| 2009/0017797 A1 | 1/2009 | Li et al. | |
| 2009/0097428 A1* | 4/2009 | Kneckt et al. | 370/311 |
| 2009/0103501 A1* | 4/2009 | Farrag et al. | 370/337 |
| 2009/0196212 A1 | 8/2009 | Wentink | |
| 2009/0279474 A1* | 11/2009 | Chou et al. | 370/315 |
| 2009/0290520 A1* | 11/2009 | Roberts et al. | 370/311 |
| 2010/0008274 A1 | 1/2010 | Kneckt et al. | |
| 2010/0009725 A1* | 1/2010 | Banerjea | 455/574 |
| 2010/0157863 A1* | 6/2010 | Gong et al. | 370/311 |
| 2010/0165896 A1* | 7/2010 | Gong et al. | 370/311 |
| 2010/0325459 A1 | 12/2010 | Kangude et al. | |
| 2011/0122780 A1 | 5/2011 | Nieminen et al. | |
| 2011/0128901 A1* | 6/2011 | Lee et al. | 370/311 |
| 2011/0134820 A1* | 6/2011 | Lee et al. | 370/311 |

(Continued)

FOREIGN PATENT DOCUMENTS

WO     2011019175 A2     2/2011

OTHER PUBLICATIONS

International Search Report and Written Opinion—PCT/US2013/067225, International Search Authority—European Patent Office, Feb. 6, 2014.

*Primary Examiner* — Hassan Kizou
*Assistant Examiner* — Hashim Bhatti
(74) *Attorney, Agent, or Firm* — Paradice and Li, LLP (57) ABSTRACT

This disclosure describes systems and methods for implementing power save modes of operation while maintaining a WLAN communications link. The techniques of the invention involve coordinating power save mode periods between the participating devices by through the use of a Peer Power Save Information Element (PPS IE) included in the beacon frame transmitted by one of the devices. The PPS IE may include an Enabled/disabled bit, a PPS Count value and a PPS Duration. The PPS Count may be decremented from an initial value after each beacon transmission until the count reaches zero, at which point the device may be configured to enter power save mode for the period indicated by the PPS Duration. During power save mode, the device may track the duration and awaken after the corresponding period of time to begin transmitting and receiving beacons again.

26 Claims, 6 Drawing Sheets

(56) References Cited

U.S. PATENT DOCUMENTS

| | | |
|---|---|---|
| 2011/0161697 A1 | 6/2011 | Qi et al. |
| 2011/0188391 A1 | 8/2011 | Sella et al. |
| 2011/0235561 A1* | 9/2011 | Liu et al. ............... 370/311 |
| 2012/0151028 A1* | 6/2012 | Lu et al. ............... 709/223 |
| 2012/0188885 A1* | 7/2012 | Tazebay et al. ............... 370/252 |
| 2012/0195227 A1* | 8/2012 | Vedantham et al. ............ 370/253 |
| 2013/0064152 A1* | 3/2013 | Seok ............... 370/311 |
| 2013/0235720 A1* | 9/2013 | Wang et al. ............... 370/229 |
| 2014/0003286 A1* | 1/2014 | Estevez et al. ............... 370/254 |

* cited by examiner

SYSTEMS AND METHODS FOR POWER SAVINGS IN WIRELESS COMMUNICATIONS

FIELD OF THE PRESENT INVENTION

The present disclosure generally relates to wireless communications and more particularly relates to systems and methods for coordinating power saving modes between networks nodes.

BACKGROUND OF THE INVENTION

Wireless networks are increasingly employed to provide various communication functions including voice, video, packet data, messaging and the like, such as through use of wireless local area networks (WLANs) conforming to 802.11 standards established by The Institute of Electrical and Electronics Engineers. WLANs are often configured in an infrastructure network topology in which an access point (AP) coordinates communications for a number of associated stations (STAs) as well as providing management and control functions. However, another important network topology involves two or more STAs, or peers, that directly exchange information without the use of an AP as an intermediary. Such ad hoc networks rely on a peer to peer relationship between the stations. While peer to peer communications systems may provide greater convenience by avoiding the need for an AP, accommodations may be required to provide functionality that would otherwise be performed by a centralized control device.

Since many devices used in wireless communications systems are mobile, enhanced power management techniques are desirable to extend battery life. To this end, considerably effort has been expended in infrastructure networks to develop power saving techniques, many of which involve increasing the amount of time the STAs and AP may spend in low power modes of operation, known as sleep or doze modes. As with other network functions, a STA may coordinate entry and exit from a power save mode with its AP. In one power management strategy, a STA may asynchronously signal that it is entering a power save mode through the use of a power management message contained in a packet sent to the AP. Upon receipt of a power management message indicating the STA is in power save mode, the AP may buffer packets to be sent to the STA. The AP periodically transmits beacons with a traffic indication message (TIM) that may be used to indicate that data is ready to be transmitted to the STA. The period of time between beacon transmissions may be termed the beacon interval. The STA generally utilizes a period of time called the listen interval, corresponding to a plurality of beacon intervals, to coordinate its power save with the AP. The AP buffers data for the STA during the listen interval and the STA may awaken from power save mode to receive the beacon at the end of each listen interval. If the beacon indicates data is pending, the STA will initiate transfer of that data. Conversely, if no data is ready to be transmitted, the STA may return to power save mode.

In contrast, a peer to peer network lacks an AP for coordination of power management and may be unable to utilize the same strategies. For example, the high speed extensions in the BLUETOOTH® (Bluetooth) 3.0 specification enable two devices having WLAN radios communicating over a Bluetooth link to establish a Bluetooth Alternate MAC/PHY (AMP) link by using the WLAN radios in a peer to peer relationship. Implementation of the Bluetooth AMP link involves operation of the WLAN radios of both devices in an AP-like mode, including the continuous, periodic transmission of beacon frames while the AMP link is active. As a consequence, conventional power saving mechanisms for WLAN devices involving a device entering a power save mode for a period of time, such as the use of a power management message as described above, may not be employed while maintaining the AMP link. Further, since the beacon transmissions occur regardless of data transfer, this requirement may represent inefficient power consumption. For example, when network conditions result in periods when traffic is not being exchanged, such as when there is a delay in streaming from the backhaul and no data is being transferred over the AMP link, this power expenditure provides no benefit.

Other peer to peer communications systems, such as the WiFi Direct™ (WiFi Direct) protocol, may exhibit similar inefficiencies when the need to periodically transmit beacons interferes with the ability of a device to utilize power management strategies. Further, within the context of this disclosure, other network topologies may be considered to have analogous aspects to these peer to peer examples and similarly benefit from enhanced coordination of power save modes between network nodes. For example, a device may be configured to operate in a software-enabled access point mode to provide access point-like functionality. Such implementations are known as "softAPs."

Accordingly, there is a need for coordinating power management between peers in a wireless communication system. The techniques of this disclosure satisfy this and other needs.

SUMMARY OF THE INVENTION

This disclosure is directed to systems and methods for coordinating power saving modes between networks nodes. In one aspect, the systems include a device for wireless communication with a wireless local area network (WLAN) module configured to implement a WLAN communications link, wherein maintaining the communications link includes periodically transmitting a beacon frame containing a power save information element with the WLAN module and a peer power save module configured to include in the power save information element of the beacon frame information indicating the WLAN module will enter a power save mode. The peer power save module may be further configured to include the information indicating the WLAN module will enter a power save mode in the power save information element after the communications link has been inactive for a predefined period of time. Further, the power save information element may include a count value such that the peer power save module is further configured to decrement the count value from an initial value with each beacon transmission after the communications link has been inactive for the predefined period of time. In such embodiments, the peer power save module may be configured to transition the WLAN module to a power save mode when the count value reaches zero. Additionally, the power save information element may include a duration value such that the WLAN module is configured to remain in the power save mode for a period of time corresponding to the duration value.

As desired, the peer power save module may also be configured to track a number of times the WLAN module has entered the power save mode while the communications link has been inactive and to disable the communications link when the number exceeds a threshold. In addition, the device may be further configured to maintain an alternate communications link to allow the disabled communications link to be re-enabled.

In some embodiments, the communications link is a Bluetooth Alternate MAC/PHY (AMP) link. In another embodiment, the device may be configured to function as a softAP.

In another aspect, the systems may include a device for wireless communication having a wireless local area network (WLAN) module configured to implement a WLAN communications link, wherein maintaining the communications link includes periodically receiving a beacon frame sent by a peer device containing a power save information element with the WLAN module and a peer power save module configured to transition the WLAN module to a power save mode after receiving a beacon frame wherein the power save information element includes information the peer device will enter a power save mode. The power save information element may also include a count value such that the peer power save module may be configured to transition the WLAN module to a power save mode when the count value is zero and the power save information element includes information the peer device will enter a power save mode. Further, the power save information element may also include a duration value such that the WLAN module is configured to remain in the power save mode for a period of time corresponding to the duration value.

In yet another aspect, the methods of the disclosure may include the steps of implementing a wireless local area network (WLAN) communications link with a WLAN module, periodically transmitting a beacon frame containing a power save information element including information indicating the WLAN module is in active mode, and transmitting a beacon frame containing a power save information element including information indicating the WLAN module will enter a power save mode. Further, transmitting the beacon frame containing the power save information element including information indicating the WLAN module will enter a power save mode may occur after the communications link has been inactive for a predefined period of time. As desired, the methods may also include transmitting a series of beacon frames having a power save information element with a count value that decrements from an initial value with each transmission after the communications link has been inactive for the predefined period of time. In addition, the WLAN module may be placed in a power save mode when the count value reaches zero. In some embodiments, the power save information element may also include a duration value, such that the methods may include maintaining the WLAN module in the power save mode for a period of time corresponding to the duration value.

The noted methods may further include the steps of tracking a number of times the WLAN module has entered the power save mode while the communications link has been inactive and disabling the communications link when the number exceeds a threshold. Further, the methods may include maintaining an alternate communications link to allow the disabled communications link to be re-enabled.

In another aspect, the methods of the disclosure may include the steps of implementing a wireless local area network (WLAN) communications link with a WLAN module, receiving a beacon frame sent by a peer device containing a power save information element including information indicating the peer device will enter a power save mode, and placing the WLAN module in a power save mode after receiving the beacon frame. Further, the power save information element may also include a count value, such that the methods may include placing the WLAN module in a power save mode when the count value is zero and the power save information element includes information the peer device will enter a power save mode. As desired, the methods may also include sending a message to other associated devices indicating a transition to the power save mode. Still further, the power save information element may also include a duration value, such that the methods include the step of maintaining the WLAN module in the power save mode for a period of time corresponding to the duration value.

A further aspect of the disclosure is directed to a non-transitory processor-readable storage medium for coordinating a power save mode of a wireless local area network (WLAN) module implementing a WLAN communications link; the processor readable storage medium having instructions thereon, the instructions including code for causing periodic transmission of a beacon frame containing a power save information element including information indicating the WLAN module is in active mode and code for causing transmission of a beacon frame containing a power save information element including information indicating the WLAN module will enter a power save mode.

In addition, the storage medium may also include code for causing transmission of the beacon frame containing the power save information element including information indicating the WLAN module will enter a power save mode after the communications link has been inactive for a predefined period of time.

As desired, the storage medium may include code for causing the transmission of a series of beacon frames having a power save information element with a count value which decrements from an initial value with each transmission after the communications link has been inactive for the predefined period of time. Further, the storage medium may include code for causing the WLAN module to enter a power save mode when the count value reaches zero. When the power save information element also includes a duration value, the storage medium may include code for maintaining the WLAN module in the power save mode for a period of time corresponding to the duration value.

Further, the storage medium may include code for tracking a number of times the WLAN module has entered the power save mode while the communications link has been inactive and code for disabling the communications link when the number exceeds a threshold. In addition, the storage medium may also include code for maintaining an alternate communications link to allow the disabled communications link to be re-enabled.

An additional aspect of the disclosure is directed to a non-transitory processor-readable storage medium for coordinating a power save mode of a wireless local area network (WLAN) module implementing a WLAN communications link; the processor readable storage medium having instructions thereon, the instructions including code for causing reception of a beacon frame containing a power save information element including information indicating the WLAN module is in active mode and code for causing the WLAN module to enter a power save mode after receiving the beacon frame. Additionally, the power save information element may also include a count value, such that the storage medium may also include code for placing the WLAN module in a power save mode when the count value is zero and the power save information element includes information the peer device will enter a power save mode. As desired, the storage medium may also include code for sending a message to other associated devices indicating a transition to the power save mode. Further, when the power save information element includes a duration value, the storage medium may also include code for maintaining the WLAN module in the power save mode for a period of time corresponding to the duration value.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION OF THE INVENTION

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer or processor memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

As will be discussed in detail below, this disclosure is directed to systems and methods for implementing power save modes of operation while maintaining a WLAN communications link. The techniques of the invention involve coordinating power save mode periods between the participating devices through the use of a Peer Power Save Information Element (PPS IE) included in the beacon frame transmitted by one of the devices. The PPS IE may include an Enable bit, a PPS Count value and a PPS Duration. The PPS Count may be decremented from an initial value after each beacon transmission until the count reaches zero, at which point the device may be configured to enter power save mode for the period indicated by the PPS Duration. Upon entry to the power save mode, portions of the WLAN system may operate in a low power mode, such as a sleep or doze state. The device may track the duration of time spent in the power save mode and awaken after the corresponding period of time to begin transmitting and receiving beacons again.

Figure 1:
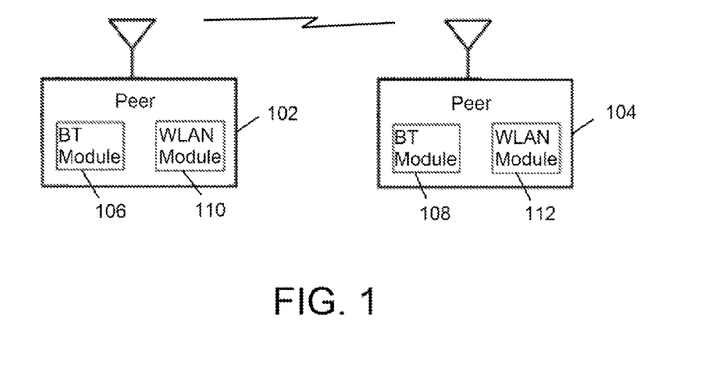
FIG. 1 depicts a peer to peer wireless communication system, according to an embodiment of the invention.

These systems and methods are described in reference to an exemplary wireless communication system 100 as shown in FIG. 1, which fundamentally includes at least two nodes, peer 102 and peer 104. In this embodiment, peer 102 and peer 104 each have Bluetooth (BT) modules 106 and 108, respectively, and WLAN modules 110 and 112, respectively. The Bluetooth specification allows for the creation of a personal area network (PAN) between a master and up to seven slaves and is often used to connect and exchange information between mobile phones, computers, digital cameras, wireless headsets, speakers, keyboards, mice or other input peripherals, and similar devices. Conventional Bluetooth communications employ a dedicated physical layer as indicated by Bluetooth modules 106 and 108 using a frequency-hopping spread spectrum technique. The data transfer rate of a Bluetooth 2.0 system employing an enhanced data rate (EDR) is up to 3 Mbps. To achieve higher throughput, a peer to peer AMP link as defined by Bluetooth 3.0 may employ the physical layer of collocated WLAN modules 110 and 112 to achieve a rate of up to 24 Mbps. In other embodiments, WLAN module 110 of peer 102 and WLAN module 112 of peer 104 may communicate using another suitable peer to peer protocol, such as WiFi Direct. For example, peer 102 may function in the role of a WiFi Direct Peer to Peer (P2P) Group Owner (GO) and peer 104 may function in the role of a WiFi Direct P2P Client.

Operation of peer 102 in the network connection with peer 104 includes the periodic transmission of a management frame known as a beacon. Although discussed in the context of peer 102, it will be appreciated that peer 104 may also transmit a beacon frame, such as when the peer to peer connection is an AMP link or in other network topologies. As such, these techniques may also be extended to peer 104 as applicable. Further, these techniques may also be applied to other network architectures having analogous aspects. In one example, a device configured to function as a softAP may be considered to operate in a manner similar to the other peer to peer architectures disclosed herein, since this configuration involves direct communication between the softAP and an associated device. As such, peer 102 may also be a device acting in a softAP role while peer 104 may be a station associated with the softAP. To the extent that IEEE 802.11 protocols may dictate certain operational characteristics for a device acting in a softAP role that conflict with aspects of this disclosure, such as a requirement for the continuous transmission of periodic beacons, a softAP functioning as peer 102 may constitute a proprietary solution.

The beacon frame is used to communicate parameters regarding operation of the peer to peer communication, including identification information, supported rates, timing information and the like. The time interval between the start of two consecutive beacons is called a beacon interval and may be used to establish a target beacon transmit time (TBTT). The beacon interval may be fixed or variable and may be set to a suitable duration, e.g., 100 msec.

Figure 2:
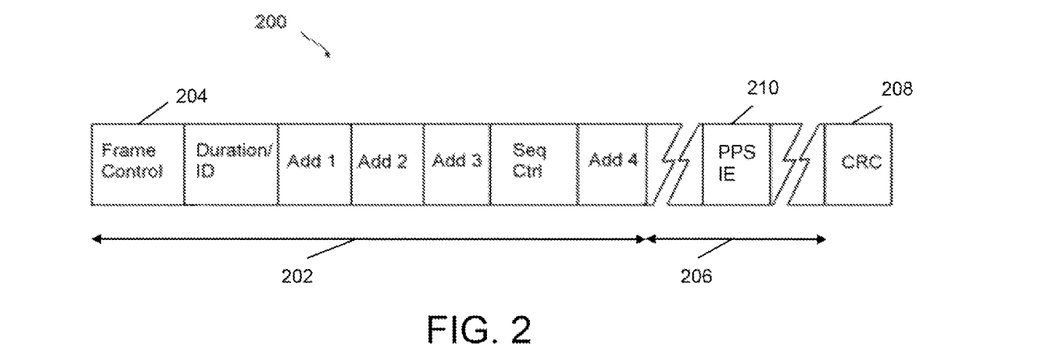
FIG. 2 is a schematic representation of the format of a beacon frame that may be used to coordinate a power save mode between peers, according to an embodiment of the invention.

An example of a generalized beacon frame 200 having a format corresponding to IEEE 802.11 standards is depicted in FIG. 2. As shown, frame 200 includes a MAC header 202, containing the frame control 204, duration/ID, address and sequence control fields, a variable length frame body 206 that may include required fields as well as optional vendor-oriented information elements, and cyclic redundancy check (CRC) field 208 that provides a frame check sequence (FCS) function. The frame control 204 segment of MAC header 202 includes fields providing various types of control information, including an identification of the 802.11 protocol of the frame, the type and subtype of the frame, distribution system information, information regarding additional information to be transmitted, security and order information. FIG. 2 also shows that frame body 206 preferably contains Peer Power Save (PPS) information element (IE) 210. As will be described below, the fields of PSS IE 210 may be used by peer 102 to communicate information to peer 104 to coordinate entry and exit from a power save mode. As will be appreciated, frame body 206 may include a plurality of proprietary information elements that may be vendor-defined, any of which may be employed as PPS IE 210. Alternatively, a new PPS IE 210 may be defined and incorporated into the relevant 802.11 protocol.

In one aspect, the PPS IE may include information in the form of an "Enabled" field of one bit to indicate whether peer 102 will enter a power save mode. Accordingly, the PPS IE Enabled field may have a value of '0' to indicate that peer 102 is in active mode and may have a value of '1' to indicate that peer 102 will enter a power save mode. In another aspect, the PPS IE may include a "Count" field having an integer variable. As will be described below, the Count field is a counter that decrements from a given initial number with each beacon transmission, such that peer 102 may enter a power save mode after the Count field reaches 0. The Count field may have any suitable initial value configured to provide the appropriate performance in delaying entry of peer 102 to a power save mode. In one example, the initial value of the Count field may be 5. In yet another aspect, the PPS IE may also include a "Duration" field to communicate the duration for which peer 102 will be in a power save mode. In some embodiments, the Duration field may be an integer representing a given number of beacon intervals. Setting the Duration field to 0 may be used to prevent peer 102 from entering a power save mode, regardless of the other parameters.

To provide proper coordination of power save modes between peers, it is desirable for all devices participating in the network to be configured to process the information associated with the PPS IE. The capabilities of each device may be confirmed by parsing any beacon frames sent by other devices that are received by peer 102, such as those sent by peer 104, to determine the presence of PPS IE 210. Provided that all beacons sent by participating devices contain a PPS IE, peer 102 may enter and exit a power save mode as indicated by the PPS IE 210 in its beacon transmissions without disrupting operation of the network as the other devices will have proper notification of the change in state. On the other hand, if any participating device transmits a beacon frame without a PPS IE, this may be taken as an indication that the device lacks the functionality and peer 102 may operate in a compatibility mode in which peer 102 does not enter a power save mode.

Figure 3:
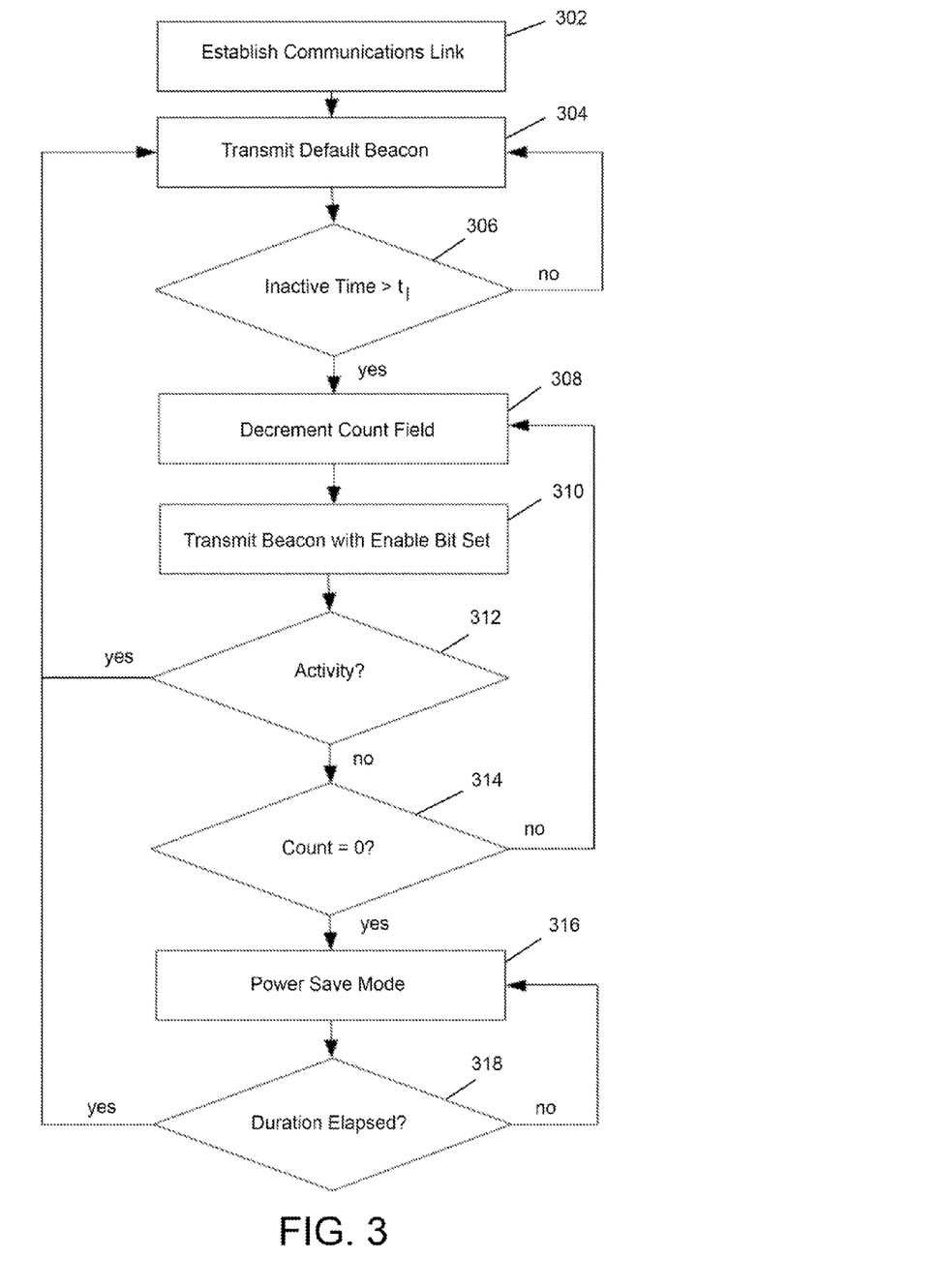
FIG. 3 depicts a flowchart showing a routine for sending beacon frames to coordinate a power save mode between peers, according to an embodiment of the invention.

A suitable routine for sending a beacon with a PPS IE to coordinate entry and exit from a power save mode that may be used in the systems and methods of this disclosure is depicted in the flowchart shown in FIG. 3. The routine starts with the establishment of a communications link between the physical layers of the respective WLAN modules, such as an AMP link between WLAN module 110 of peer 102 and WLAN module 112 of peer 104 as indicated by step 302. Next, peer 102 transmits a default beacon with PPS IE 210 having the Enable field set to '0' to indicate peer 102 is operating in active mode in step 304. The PPS Count field also may be set to the initial value. As will be appreciated, peer 102 may initiate a transition to a power save state when the communications link with peer 104 exhibits a threshold level of inactivity, such as over a predefined period of time. As represented by step 306, peer 102 may determine whether a period without activity over the communications link exceeds a predefined inactive time, $t_1$, which may be set to any suitable value that provides a desired balance between performance and power efficiency. If activity has occurred, peer 102 may transmit another default beacon as indicated by the return of the routine to step 304. On the other hand, if the threshold time has elapsed, peer 102 may then decrement the PPS IE Count field by one in step 308. Next, peer 102 may set the PPS IE Enable field to '1' and send a beacon frame in step 310. Then, peer 102 may confirm whether the communications link is still inactive as indicated by step 312. If the link has experienced activity, the routine returns to step 304 to reset the PPS IE Count field and set the Enable bit to '0.' If the link is still inactive, the routine continues to step 314 and peer 102 checks the Count field of the PPS IE to determine if the counter has elapsed. If the value is greater than or equal to one, the routine returns to step 308 to send another beacon frame. If the value equals zero, however, peer 102 may enter a power save mode as indicated by step 316, wherein WLAN module 110 may operate in a low power or inactive mode, which includes a cessation of beacon transmission. Finally, peer 102 may remain in power save mode until a period of time corresponding to the Duration field of PPS IE has elapsed. As indicated by step 318, the routine returns to step 316 until the Duration has elapsed, at which point peer 102 reactivates and returns to step 304 to reset the PPS IE Count field and set the Enable bit to '0'.

It may be desirable to employ a Count value that corresponds to the operating context of peer 102. For example, if Bluetooth module 106 of peer 102 is acting in the role of a master with respect to a plurality of associated slave devices, it may be desirable to set the initial Count value to a number sufficient to allow indication of the upcoming transition to a power save mode to be communicated to all the associated devices, such as the exemplary value of 5 as given above. In other contexts, the Count value may be set to a lower number if peer 102 is in communication with only one or a few other devices.

Figure 4:
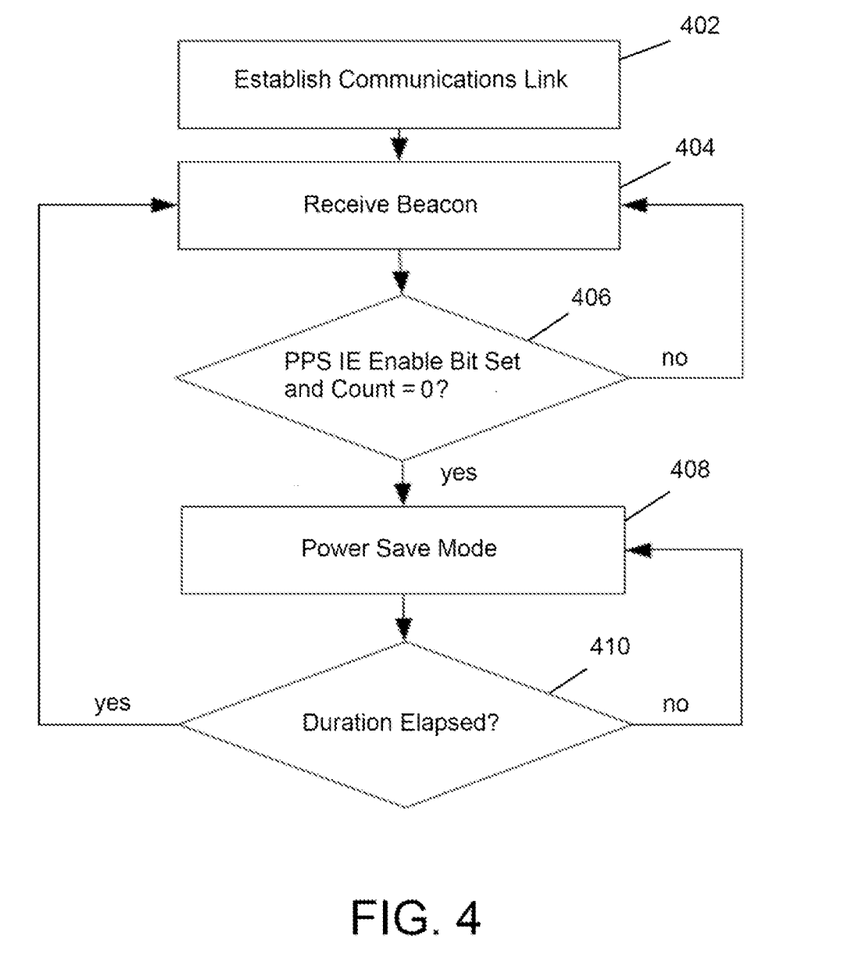
FIG. 4 depicts a flowchart showing a routine for receiving beacon frames to coordinate a power save mode between peers, according to an embodiment of the invention.

Similarly, a suitable routine for receiving a beacon with a PPS IE to coordinate entry and exit from a power save mode that may be used in the systems and methods of this disclosure is depicted in the flowchart shown in FIG. 4. The routine starts with the establishment of a WLAN communications link between peer 102 and 104 as indicated by step 402. Next, peer 104 receives a beacon with a PPS IE 210 transmitted by peer 102 as indicated by step 404. Peer 104 checks the values of the Enable and Count fields of PPS IE in step 406. If the Enable bit is not set to '1' or the Count value is not set to '0,' peer 104 may operate normally and return to step 404 to await reception of another beacon. However, if both the Enable bit is set to '1' and the Count value is set to '0,' peer 104 may determine that peer 102 will be entering a power save mode for the time period advertised by the Duration value. Correspondingly, peer 104 may also enter a power save mode as indicated by step 408, wherein WLAN module 112 operates in a low power state. Peer 104 may remain in power save mode until a period of time corresponding to the Duration field of PPS IE has elapsed. As indicated by step 410, the routine returns to step 408 until the Duration has elapsed, at which point peer 104 may return to active mode and the routine may return to step 404 to await reception of another beacon or other transmission from peer 102.

Under some situations, peer 104 may be associated with other devices, such as by employing Bluetooth module 108 to form Bluetooth communications link by acting in the role of a Bluetooth master with respect to additional Bluetooth slave devices. In such embodiments, peer 104 may be configured to send messages to the associated devices indicating the transition to the power save mode. For example, peer 104 may send a PPS IE to these other associated devices. By employing these techniques, peer 104 as well as peer 102 may obtain the power savings benefits.

In some embodiments, it may be desirable for the device initiating the power save coordination, such as peer 102, to track the number of times the power save mode is entered without experiencing activity over the communications link. A threshold number of iterations may be established such that when exceeded, peer 102 may be configured to disable the communications link. Peer 102 may be further configured to maintain an alternate communications link with peer 104 when the communications link is disabled, such as a Bluetooth link between respective Bluetooth modules 106 and 108. By maintaining the alternate communications link, the disabled communications link may be easily reestablished when conditions warrant, such as when sufficient data has been buffered for transmission at peer 102 or peer 104 that may be sent using a higher rate provided by the restored communications link.

Figure 5:
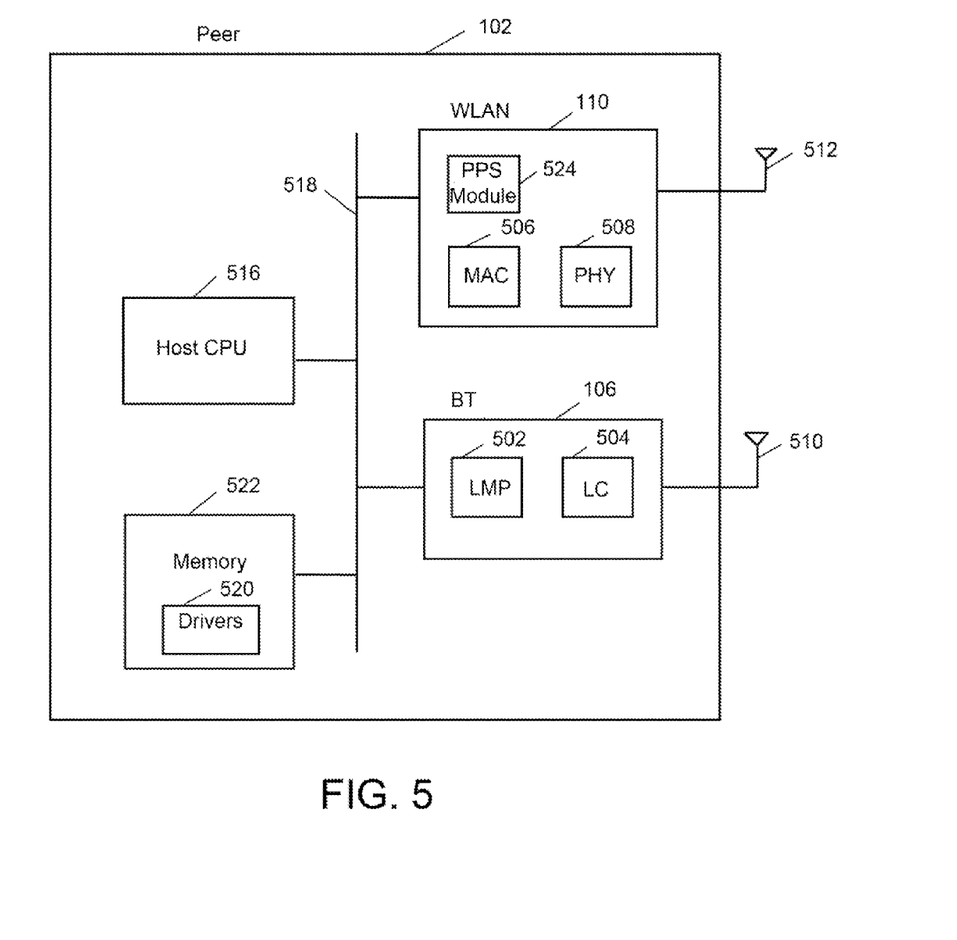
FIG. 5 schematically depicts functional blocks of a peer communications device, according to an embodiment of the invention.

As discussed above, embodiments of this disclosure are suitable for use in a Bluetooth communication system featuring AMP link capability. Accordingly, FIG. 5 is a high level schematic diagram of the principle functional blocks of peer 102. Generally, peer 102 may employ an architecture in which the lower levels of the respective protocol stacks of Bluetooth module 106 and WLAN module 110 are implemented in firmware and hardware modules, including Bluetooth module 106 and WLAN module 110. Bluetooth module 106 includes Link Manager Protocol (LMP) 502 for managing the Bluetooth radio frequency link between peer 102 and peer 104 by performing advertisement, scanning, connection and security functions. Bluetooth module 106 also includes Link Controller (LC) 504 for performing the hardware-specific transmission and reception of electronic signals. Likewise, WLAN module 110 includes media access controller (MAC) 506 that performs functions related to the handling and processing of frames of data including verification, acknowledgment, routing, formatting and the like. Incoming and outgoing frames are exchanged between MAC 506 and physical layer (PHY) 508, which as shown here includes the functions of modulating the frames according to the relevant 802.11 protocol as well as providing the analog processing and RF conversion necessary to provide transmission and reception of wireless signals. In embodiments implementing a Bluetooth AMP link, information from upper layers of the Bluetooth protocol stack are directly exchanged with MAC 506 and PHY 508 of WLAN module 110.

As shown, Bluetooth module 106 and WLAN module 110 each have an associated antenna, antennas 510 and 512, respectively. As desired, one or more antennas may be shared between the modules using switching techniques known in the art. In some embodiments, Bluetooth module 106 and WLAN module 110 may be collocated on a common system, e.g., on the same circuit board or on distinct circuit boards within the same system, or may be embedded on the same integrated circuit as in a system on a chip (SoC) implementation.

Peer 102 also includes host CPU 516 configured to perform the various computations and operations involved with the functioning of peer 102. Host CPU 516 is coupled to Bluetooth module 106 and WLAN module 110 through bus 518, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the Bluetooth and WLAN systems are generally implemented in software as Drivers 520 stored in memory 522 that may be accessed by host CPU 516 over bus 518. Details regarding the Bluetooth protocol stack are discussed below in reference to FIG. 6.

As shown, WLAN module 110 also includes Peer Power Save (PPS) module 524 that may be implemented as processor readable instructions stored in firmware and operable by WLAN module 110 as shown. PPS module 524 may be configured to perform steps associated with the routines depicted in FIGS. 3 and 4, for example. In other embodiments, PPS module 524 may be implemented in software or hardware at any suitable location within peer 104.

Figure 6:
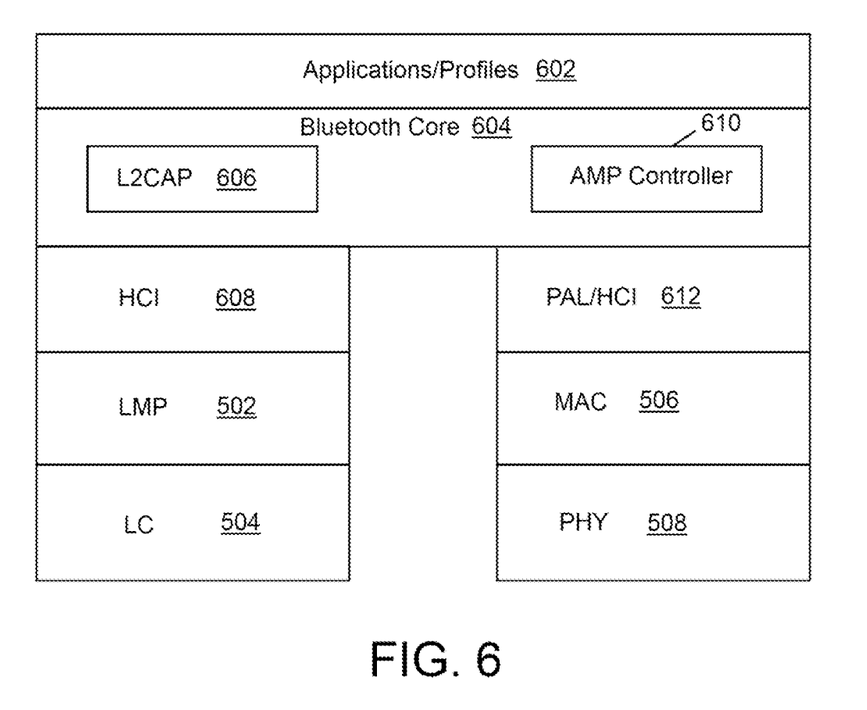
FIG. 6 represents portions of a Bluetooth stack incorporating an AMP link.

Turning now to FIG. 6, a more detailed representation of Bluetooth protocol stack 600 is shown, particularly with regard to the logical division of the upper Bluetooth protocol layers implemented as software processes operating in host CPU 516 and the use of WLAN lower protocol layers in an AMP link. As shown, Bluetooth protocol stack 600 generally features a host stack operating in host CPU 516 having an application and profile layer 602 and a Bluetooth core 604. Bluetooth core 604 includes a logical link control and adaptation protocol (L2CAP) layer 606 that provides multiplexing of data from the upper protocol layers and the formatting of packets. The packaged data is exchanged over host controller interface (HCI) 606 with the lower layer protocols, LMP 502 and LC 504 discussed above. Bluetooth core 604 also includes AMP controller 610 for creating and maintaining an AMP link using WLAN module 110. In particular, AMP controller 610 exchanges packets with protocol adaptation layer (PAL) 612 which in turn provides communication with MAC 506 and PHY 508 of WLAN module 110. Accordingly, after AMP controller 610 establishes an AMP link between peer 102 and peer 104, data may be received and sent from the upper layers of Bluetooth stack 600 directly to the lower layers of WLAN module 110.

Figure 7:
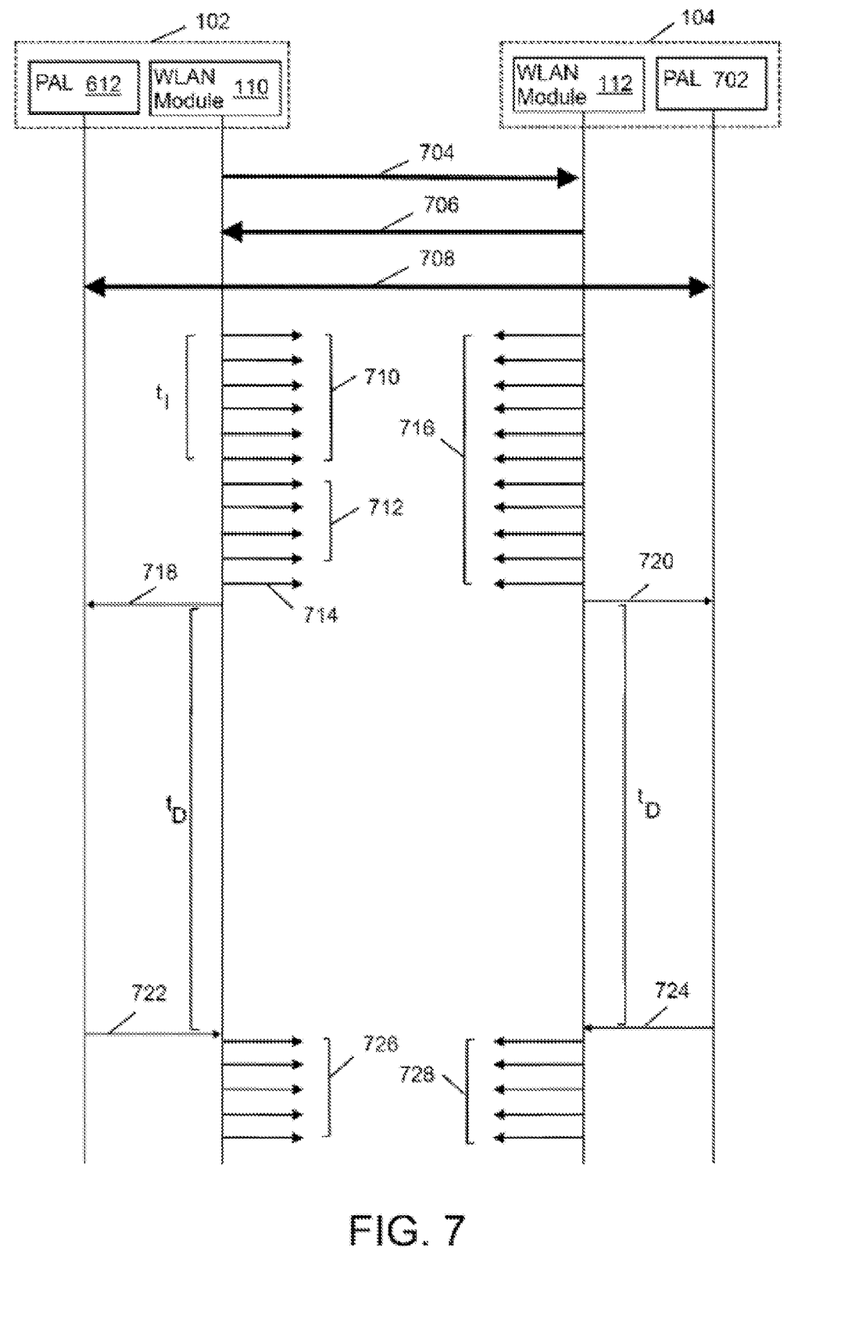
FIG. 7 depicts a sequence diagram showing the use of beacon frames to coordinate a power save mode between peers, according to an embodiment of the invention.

An example of power save mode coordination in the context of an AMP link involving peer 102 and peer 104 is depicted in FIG. 7 as a sequence diagram. As shown, creation of the AMP link involves interoperation of WLAN module 110, in particular MAC 506 and PHY 508, and PAL 612 on peer 102 and WLAN module 112 and corresponding PAL 702 on peer 104. Creation of the AMP link involves a request 704 generated by peer 102 and sent by WLAN module 110 that is received by peer 104 at WLAN module 112. WLAN module 112 returns a response 706 resulting in the formation of AMP link 708. As described above, peer 102 and peer 104 each periodically transmit beacon frames while the AMP link is active. Beacon group 710 sent by peer 102 includes PPS IE 210 having the Enable bit set to '0' as the inactivity interval represented by $t_1$ has not elapsed. However, in beacon group 712, the inactivity interval $t_1$ has elapsed, so that each beacon frame has a PPS IE 210 with the Enable bit set to '1' and with a Count value that decrements by one. In this example, the initial Count value is 5 so that beacon frame 714 following beacon group 712 has a PPS IE with the Enable bit set to '1' and a Count value of '0.' Conversely, peer 104 may simply transmit the same beacon frame for each beacon in group 716. Since peer 104 is not coordinating the power save mode in this example, each frame may include a PPS IE with the Enable bit set to '0' to indicate peer 104 is configured to interpret and process the information associated with a PSS IE and may coordinate a power save mode as signaled by peer 102.

Following transmission of beacon frame 714, WLAN module 110 may enter a power save mode and sends signal 718 to PAL 612 to begin clocking the Duration advertised in the PPS IE, represented by $t_D$. Similarly, upon reception of beacon frame 714 at WLAN module 112, peer 104 sends signal 720 to PAL 702 to begin clocking the $t_D$ and WLAN module 112 also enters a power save mode. Upon completion of $t_D$, PAL 612 sends signal 722 to WLAN module 110 and PAL 702 sends signal 724 to WLAN module 112 to return the respective WLAN modules to active state. Peer 102 and peer 104 may then resume sending beacon frames as indicated by beacon groups 726 and 728.

Described herein are presently preferred embodiments. However, one skilled in the art that pertains to the present invention will understand that the principles of this disclosure can be extended easily with appropriate modifications to other applications.

What is claimed is:

1. A device for wireless communication comprising:
   a wireless local area network (WLAN) module to implement a WLAN communications link, wherein the WLAN module is configured to maintain the communications link by transmitting a beacon frame containing a power save information element; and
   a peer power save module configured to include, in the power save information element of the beacon frame, information that the WLAN module will enter a power save mode;
   wherein the power save information element further comprises a count value, and wherein the peer power save module is further configured to decrement the count value from an initial value with each beacon transmission after the communications link has been inactive for a predefined period of time.

2. The device of claim 1, wherein the peer power save module transitions the WLAN module to a power save mode when the count value reaches zero.

3. The device of claim 2, wherein the power save information element further comprises a duration value and wherein the WLAN module is configured to remain in the power save mode for a period of time corresponding to the duration value.

4. The device of claim 2, wherein the peer power save module is configured to track a number of times the WLAN module has entered the power save mode while the communications link has been inactive and to disable the communications link when the number exceeds a threshold.

5. The device of claim 4, wherein the device is configured to maintain an alternate communications link to allow the disabled communications link to be re-enabled.

6. The device of claim 1, wherein the communications link is a Bluetooth Alternate MAC/PHY (AMP) link.

7. The device of claim 1, wherein the device is configured to function as a softAP.

8. A device for wireless communication comprising:
   a wireless local area network (WLAN) module configured to implement a WLAN communications link, wherein the WLAN module is configured to maintain the communications link by receiving a beacon frame sent by a peer device containing a power save information element; and
   a peer power save module configured to transition the WLAN module to a power save mode when a received beacon frame has a power save information element that includes information that the peer device will enter a power save mode;
   wherein the power save information element further comprises a count value, and wherein the peer power save module is configured to transition the WLAN module to a power save mode when the count value is zero.

9. The device of claim 8, wherein the power save information element further comprises a duration value and wherein the WLAN module is configured to remain in the power save mode for a period of time corresponding to the duration value.

10. A method for wireless communication comprising:
    implementing a wireless local area network (WLAN) communications link with a WLAN module;
    transmitting, with the WLAN module, a beacon frame containing a power save information element including information indicating the WLAN module is in active mode;
    transmitting, with the WLAN module, a beacon frame containing a power save information element including information indicating the WLAN module will enter a power save mode, and
    transmitting a series of beacon frames having a power save information element with a count value that decrements from an initial value with each transmission after the communications link has been inactive for a predefined period of time.

11. The method of claim 10, further comprising placing the WLAN module in a power save mode when the count value reaches zero.

12. The method of claim 11, wherein the power save information element further comprises a duration value, further comprising maintaining the WLAN module in the power save mode for a period of time corresponding to the duration value.

13. The method of claim 11, further comprising tracking a number of times the WLAN module has entered the power save mode while the communications link has been inactive and disabling the communications link when the number exceeds a threshold.

14. The method of claim 13, further comprising maintaining an alternate communications link to allow the disabled communications link to be re-enabled.

15. The method of claim 10, wherein the communications link is a Bluetooth Alternate MAC/PHY (AMP) link.

16. A method for wireless communication comprising:
    implementing a wireless local area network (WLAN) communications link with a WLAN module;
    receiving, with the WLAN module, a beacon frame sent by a peer device containing a power save information element including information indicating the peer device will enter a power save mode, wherein the power save information element further comprises a count value; and
    placing the WLAN module in a power save mode after receiving the beacon frame when the count value is zero.

17. The method of claim 16, further comprising sending a message to other associated devices indicating a transition to the power save mode.

18. The method of claim 16, wherein the power save information element further comprises a duration value, further comprising maintaining the WLAN module in the power save mode for a period of time corresponding to the duration value.

19. A non-transitory processor-readable storage medium for coordinating a power save mode of a wireless local area network (WLAN) module implementing a WLAN communications link; the processor-readable storage medium having computer executable instructions thereon, the computer executable instructions comprising:
    code for transmitting a beacon frame containing a power save information element including information indicating the WLAN module is in active mode;
    code for transmitting a beacon frame containing a power save information element including information indicating the WLAN module will enter a power save mode; and
    code for transmitting a series of beacon frames having a power save information element with a count value that decrements from an initial value with each transmission after the communications link has been inactive for a predefined period of time.

20. The non-transitory processor-readable storage medium of claim 19, further comprising code for causing the WLAN module to enter a power save mode when the count value reaches zero.

21. The non-transitory processor-readable storage medium of claim 20, wherein the power save information element further comprises a duration value, further comprising code for maintaining the WLAN module in the power save mode for a period of time corresponding to the duration value.

22. The non-transitory processor-readable storage medium of claim 21, further comprising code for tracking a number of times the WLAN module has entered the power save mode while the communications link has been inactive and code for disabling the communications link when the number exceeds a threshold.

23. The non-transitory processor-readable storage medium of claim 21, further comprising code maintaining an alternate communications link to allow the disabled communications link to be re-enabled.

24. A non-transitory processor-readable storage medium for coordinating a power save mode of a wireless local area network (WLAN) module implementing a WLAN communications link; the processor-readable storage medium having computer executable instructions thereon, the computer executable instructions comprising:
    code for receiving a beacon frame sent by a peer device containing a power save information element including information indicating the peer device will enter a power save mode, wherein the power save information element further comprises a count value; and
    code for causing the WLAN module to enter a power save mode after receiving the beacon frame when the count value is zero.

25. The non-transitory processor-readable storage medium of claim 24, further comprising code for sending a message to other associated devices indicating a transition to the power save mode.

26. The non-transitory processor-readable storage medium of claim 24, wherein the power save information element further comprises a duration value, further comprising code for maintaining the WLAN module in the power save mode for a period of time corresponding to the duration value.

\* \* \* \* \*